(12) United States Patent
Wada

(10) Patent No.: US 10,663,099 B2
(45) Date of Patent: May 26, 2020

(54) PIPE COUPLING COMPRISING FEMALE COUPLING MEMBER AND MALE COUPLING MEMBER

(71) Applicant: NITTO KOHKI CO., LTD., Tokyo (JP)

(72) Inventor: Akihiro Wada, Tokyo (JP)

(73) Assignee: NITTO KOHKI CO., LTD, Tokyo (JP)

( * ) Notice: Subject to any disclaimer, the term of this patent is extended or adjusted under 35 U.S.C. 154(b) by 0 days.

(21) Appl. No.: 16/199,544

(22) Filed: Nov. 26, 2018

(65) Prior Publication Data
US 2019/0093809 A1 Mar. 28, 2019

Related U.S. Application Data

(63) Continuation of application No. PCT/JP2017/019313, filed on May 24, 2017.

(30) Foreign Application Priority Data

May 24, 2016 (JP) .................................. 2016-103135
Feb. 28, 2017 (JP) .................................. 2017-036814

(51) Int. Cl.
*F16L 37/34* (2006.01)
*F16L 37/08* (2006.01)
(Continued)

(52) U.S. Cl.
CPC ............ *F16L 37/34* (2013.01); *F16L 37/084* (2013.01); *F16L 37/36* (2013.01); *F16L 37/121* (2013.01); *F16L 2201/10* (2013.01)

(58) Field of Classification Search
CPC . F16L 37/32; F16L 37/34; F16L 37/36; F16L 37/084
(Continued)

(56) References Cited

U.S. PATENT DOCUMENTS 3,028,179 A 4/1962 Abramoska
4,135,551 A * 1/1979 Knight et al. ........ F16L 37/127
    137/614.06

(Continued)

FOREIGN PATENT DOCUMENTS

DE 2031629 12/1971
EP 1164327 12/2001
(Continued)

OTHER PUBLICATIONS

International Search Report for International Application PCT/JP2017/019313, dated Aug. 8, 2017.

*Primary Examiner* — Kevin L Lee
(74) *Attorney, Agent, or Firm* — Burris Law, PLLC

(57) ABSTRACT

A pipe coupling includes a male coupling member detachably connected to a female coupling member by a chuck member of the female coupling member. The chuck member is disposed radially outside of a female coupling body to extend forward beyond a front end opening. The chuck member is displaceable in a longitudinal direction and also radially displaceable between a locking position where a locking groove locks a locking projection and an unlocking position where the locking groove is displaced radially outward from the locking position to unlock the locking projection. When the chuck member is displaced rearward from a temporarily connecting position to a connecting position in a state where the locking groove has locked the locking projection in the temporarily connecting position, the chuck member draws the male coupling member into a female-side passage to connect the male coupling member to the female coupling member.

16 Claims, 10 Drawing Sheets

(51) Int. Cl.
  *F16L 37/36* (2006.01)
  *F16L 37/084* (2006.01)
  *F16L 37/12* (2006.01)

(58) Field of Classification Search
  USPC .................................... 137/614.03–614.06
  See application file for complete search history.

(56) References Cited

U.S. PATENT DOCUMENTS

| | | | |
|---|---|---|---|
| 4,181,150 A * | 1/1980 | Maldays | F16L 37/23 |
| | | | 137/614.06 |
| 5,546,984 A | 8/1996 | Arcaro | |
| 6,035,894 A | 3/2000 | Weh et al. | |
| 9,310,003 B2 * | 4/2016 | Blanchard et al. | F17C 13/04 |
| 2004/0074541 A1 | 4/2004 | Sharpe | |
| 2013/0174928 A1 | 7/2013 | Danielson | |

FOREIGN PATENT DOCUMENTS

| | | |
|---|---|---|
| JP | 2000515953 | 11/2000 |
| JP | 2008196603 | 8/2008 |
| JP | 2008286340 | 11/2008 |
| JP | 2010025495 | 2/2010 |
| WO | 1992008074 | 5/1992 |
| WO | 2010143259 | 12/2010 |

\* cited by examiner

PIPE COUPLING COMPRISING FEMALE COUPLING MEMBER AND MALE COUPLING MEMBER

CROSS-REFERENCE TO RELATED APPLICATIONS

This application is a continuation of International Application No. PCT/JP2017/019313, filed on May 24, 2017, which claims priority to and the benefit of JP 2016-103135 filed on May 24, 2016 and JP 2017-036814 filed on Feb. 28, 2017. The disclosures of the above applications are incorporated herein by reference.

FIELD

The present disclosure relates to a pipe coupling comprising a female coupling member and a male coupling member which are detachably connected to each other.

BACKGROUND

The statements in this section merely provide background information related to the present disclosure and may not constitute prior art.

A female coupling member and a male coupling member which are detachably connected to each other are usually configured to be connected together by engaging a locking element of the female coupling member into a locking element engagement groove of the male coupling member. The locking element is radially displaceably held in a through-hole gradually reduced in diameter toward the inner side which is formed in a cylindrical body of the male coupling member. When locking the male coupling member, the locking element projects inward from the inner peripheral surface of the cylindrical body to engage in the locking element engagement groove of the male coupling member. According to Japanese Patent Application Publication No. 2008-196603 (JP '603), when in the engaged state, the locking element is held by a sleeve from the outer side.

The female coupling member and the male coupling member are sealingly engaged with each other by a seal member, e.g. an O-ring, to prevent a fluid flowing through the inside of the coupling members from leaking to the outside. As shown in JP '603, there is also a pipe coupling wherein each coupling member is provided with a valve mechanism to close a flow path by the valve mechanism when the coupling members are not connected to each other, thereby preventing leakage of the internal fluid.

The above-described pipe couplings are configured to prevent the internal fluid from leaking to the outside by using a seal member or a valve mechanism. There may, however, be a small leakage of internal fluid adhering around the area of sealing when the coupling members are disconnected from each other, for example. When the internal fluid is a high-viscosity liquid or a corrosive liquid such as the electrolyte of a battery, if the leaking liquid adheres to a movable member such as a locking element, the liquid may solidify or corrode the movable element, resulting in the movable element being stuck to become non-displaceable, causing malfunction. If the liquid collects and solidifies in the locking element engagement groove of the male coupling member, it may be impossible to effect appropriate locking by the locking element.

SUMMARY

The present disclosure provides a female coupling member configured such that the probability of malfunctions is reduced if the internal fluid leaks out from a fluid passage. The present disclosure further provides a male coupling member, and a pipe coupling comprising the female coupling member and a male coupling member to be connected thereto.

The present disclosure provides a female coupling member detachably connectable with an associated male coupling member. The female coupling member includes the following constituent elements: a cylindrical female coupling body having a female-side passage extending from a front end opening to a rear end opening, the female coupling body being configured to receive the male coupling member into the female-side passage from the front end opening; and a chuck member disposed radially outside of the female coupling body and extending forward beyond the front end opening. The chuck member has a locking portion on a part thereof extending forward beyond the front end opening. The locking portion configured to engage with a to-be-locked portion of the male coupling member. The chuck member is displaceable in a longitudinal direction between a temporarily connecting position and a connecting position which is rearward of the temporarily connecting position. The chuck member is also radially displaceable between a locking position where the locking portion locks the to-be-locked portion and an unlocking position where the locking portion is displaced radially outward from the locking position to unlock the to-be-locked portion. The chuck member is configured such that, when the chuck member is displaced from the temporarily connecting position to the connecting position in a state where the locking portion has locked the to-be-locked portion in the temporarily connecting position, the chuck member draws the male coupling member into the female-side passage to connect the male coupling member to the female coupling member.

In the female coupling member, the chuck member, which is a movable member, is disposed radially outside of the female coupling body. That is, unlike the locking element of the conventional technique, the chuck member does not project inward from the inner peripheral surface of the female coupling body. Therefore, even if the internal fluid leaks out when the female coupling member is connected to or disconnected from the associated male coupling member, the leaking internal fluid is inhibited from reaching and adhering to the chuck member. Accordingly, it is possible to inhibit the chuck member from being stuck by the leaking fluid.

In one form, the female coupling member may further include a displacement blocking member attached to the female coupling body so as to cover the chuck member from radially outside. The displacement blocking member is configured such that, when the chuck member is in the temporarily connecting position, the displacement blocking member allows the chuck member to be displaced from the locking position to the unlocking position, and when the chuck member is in the connecting position, the displacement blocking member blocks the chuck member from being displaced from the locking position to the unlocking position.

With the above-described displacement blocking member, it is possible to inhibit the chuck member from being accidentally displaced to the unlocking position when the coupling members are in the connected state, which would otherwise unexpectedly disconnect the coupling members from each other.

In another form, the female coupling member may further include an urging member urging the chuck member radially inward toward the locking position.

Specifically, the urging member may be a ring spring disposed on an outer peripheral surface of the chuck member.

With the above-described ring spring, the chuck member, when in the temporarily connecting position, can be held in the locking position so that the temporary connection of the female coupling member with the male coupling member cannot easily be canceled.

According to one variation, the arrangement may be as follows. The chuck member has an inclined surface on an inner surface of a front end portion thereof, the inclined surface being inclined radially outward toward a forward direction. When the male coupling member is inserted into the female-side passage in a state where the chuck member is in the locking position, the male coupling member abuts against the inclined surface, causing the front end portion of the chuck member to be displaced radially outward, and thus displacing the chuck member to the unlocking position.

With the above-described structure, the male coupling member can be inserted to a position where the to-be-locked portion is locked to reach a temporarily connected state without specially operating the chuck member. Accordingly, the connecting operation can be facilitated even more.

In another variation, the arrangement may be as follows. The chuck member is displaceable in the longitudinal direction to a disconnecting position located forward of the temporarily connecting position. When the chuck member is displaced from the temporarily connecting position to the disconnecting position, the chuck member is pressed radially outward at an inner surface thereof by an outer peripheral surface of the female coupling body to reach the unlocking position.

With the above-described structure, it becomes easy to disconnect the male coupling member.

In another form, the female coupling member may further include an operating member engaged with the chuck member to displace the chuck member in the longitudinal direction at least between the temporarily connecting position and the connecting position.

Specifically, the arrangement may be as follows. The operating member has a chuck retaining member retaining the chuck member in the longitudinal direction, a lever pivotable relative to the female coupling body, and a link member connecting the chuck retaining member and the lever. By pivoting the lever, the chuck member is displaced in the longitudinal direction at least between the temporarily connecting position and the connecting position through the link member and the chuck retaining member.

The use of such a lever to displace the chuck member in the longitudinal direction enables an operation for connecting the male coupling member to be performed with a relatively small force. When either or both of the female coupling member and the male coupling member are provided with respective valve mechanisms, in particular, force for pushing in valve elements is also required when the coupling members are to be connected to each other; therefore, a relatively large longitudinal force is necessary. In this regard, however, the force required for the operator can be reduced by using the leverage of a lever. Thus, connecting and disconnecting operations can be performed even more easily.

In one form, the female coupling member may further include the following constituent elements: a valve seat part secured to the female coupling body in the female-side passage; and a female-side slide valve element disposed in the female-side passage, the female-side slide valve element being displaceable between a closed position and an open position. In the closed position, the female-side slide valve element sealingly engages the valve seat part to close the female-side passage between the front end opening and the rear end opening. In the open position, the female-side slide valve element is displaced rearward from the closed position to provide communication between the front end opening and the rear end opening; and an urging member urging the female-side slide valve element toward the closed position. When the chuck member is displaced from the temporarily connecting position to the connecting position, the male coupling member locked by the chuck member presses and displaces the female-side slide valve element to the open position.

According to one variation, the arrangement may be as follows. The urging member is a bellows, and the female coupling body has a washing hole extending therethrough from an inner peripheral surface to an outer peripheral surface thereof such that the washing hole communicates with a space between the inner peripheral surface and the bellows in the female-side passage.

In addition, the present disclosure provides a male coupling member detachably connectable to a female coupling member. The female coupling member includes a cylindrical female coupling body having a female-side passage extending from a front end opening to a rear end opening, and a chuck member disposed radially outside of the female coupling body to extend forward beyond the front end opening. The chuck member has a locking groove on an inner surface thereof. The chuck member is displaceable in a longitudinal direction between a temporarily connecting position and a connecting position which is rearward of the temporarily connecting position. The chuck member is also radially displaceable between a locking position and an unlocking position where the locking groove is displaced radially outward from the locking position. The male coupling member includes a cylindrical male coupling body having a male-side passage extending from a front end opening to a rear end opening. The male coupling body has a locking projection formed on an outer peripheral surface thereof so as to project radially outwardly. The locking projection is shaped to be lockable in the locking groove of the chuck member when in the locking position. When the chuck member is displaced from the temporarily connecting position to the connecting position in a state where the locking projection has been locked in the locking groove of the chuck member, the male coupling body is drawn into the female-side passage of the female coupling member, and thus the male coupling member is connected to the female coupling member in a state where the male-side passage and the female-side passage are communicated with each other.

The male coupling member need not have a locking element engagement groove as provided on the outer peripheral surface of the conventional male coupling member. In addition, the locking projection locked by the chuck member of the associated female coupling member is located outside the female coupling member and not inserted into the female coupling body even in a state where the male coupling member has been connected to the associated female coupling member. Therefore, even if the internal fluid leaks out when the male coupling member is connected to or disconnected from the associated female coupling member, the leaking internal fluid is inhibited from reaching and adhering to the locking projection. Accordingly, locking of the locking projection by the chuck member can be inhibited from becoming insufficient due to the leaking liquid.

In one variation, the arrangement may be as follows. The female coupling member further includes the following constituent elements: a valve seat part secured to the female coupling body in the female-side passage; and a female-side slide valve element disposed in the female-side passage, the female-side slide valve element being displaceable between a closed position and an open position. In the closed position, the female-side slide valve element sealingly engages the valve seat part to close the female-side passage between the front end opening and the rear end opening. In the open position where the female-side slide valve element is displaced rearward from the closed position to provide communication between the front end opening and the rear end opening. The female coupling member further includes an urging member urging the female-side slide valve element toward the closed position. The female-side slide valve element has a front end surface formed into an inclined surface gradually reduced in diameter radially inward toward a forward direction. The male coupling body has a rear end surface formed into an inclined surface gradually reduced in diameter radially inward toward the forward direction substantially at the same angle, or a similar angle, as the front end surface of the female-side slide valve element. When the male coupling body is drawn into the female-side passage of the female coupling member, the rear end surface of the male coupling body sealingly engages the front end surface of the female-side slide valve element.

The arrangement may also be as follows. The male coupling member further includes the following constituent elements: a male-side slide valve element disposed in the male-side passage, the male-side slide valve element being displaceable between a closed position and an open position. In the closed position, the male-side slide valve element sealingly engages an inner peripheral surface of the male coupling body to close the male-side passage between the front end opening and the rear end opening. In the open position, the male-side slide valve element is displaced forward from the closed position to provide communication between the front end opening and the rear end opening. The male coupling member further includes an urging member urging the male-side slide valve element toward the closed position. When the male coupling body is drawn into the female-side passage of the female coupling member, the male-side slide valve element is pressed and displaced to the open position by the valve member of the female coupling member.

Further, the male coupling member may be configured such that a continuous concave surface is formed by the rear end surface of the male coupling body and a rear end surface of the male-side slide valve element.

In another variation, the urging member may have a first coil spring and a second coil spring coaxially disposed inside the first coil spring.

In addition, the present disclosure provides a pipe coupling including the following constituent elements: any of the above-described female coupling members; and a male coupling member detachably connectable to the female coupling member, the male coupling member having a to-be-locked portion to be locked by the locking portion of the female coupling member.

Various forms of a female coupling member, a male coupling member, and a pipe coupling comprising the female coupling member and male coupling member according to the present disclosure will be explained below on the basis of the accompanying drawings.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
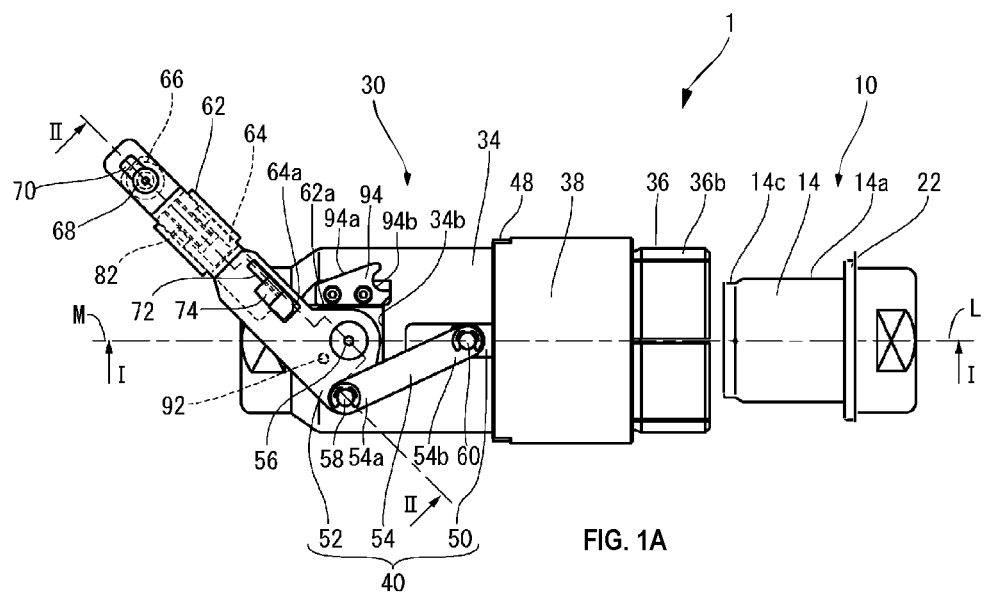
FIG. 1A is a side view of a pipe coupling in an unconnected state according to a first form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A pipe coupling 1 according to a first form of the present disclosure is shown in FIGS. 1A to 5B that comprises a male coupling member 10 and a female coupling member 30 which are detachably connectable to each other.

Figure 1B:
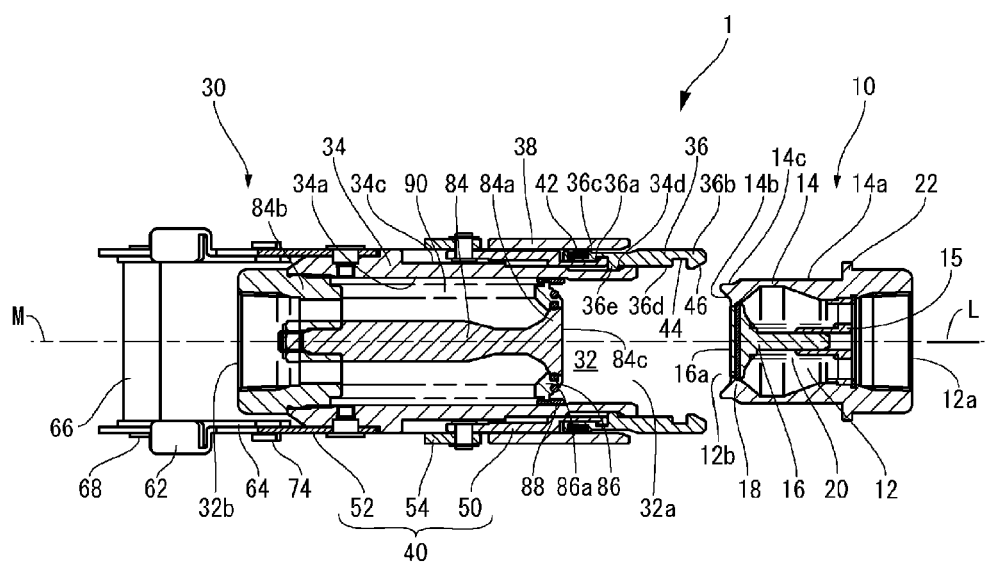
FIG. 1B is a cross-sectional view of the pipe coupling taken along the line I-I in FIG. 1A.

As shown in FIG. 1B, the male coupling member 10 includes the following constituent elements: a cylindrical male coupling body 14 having a male-side passage 12 extending between a front end opening 12a and a rear end opening 12b; a valve element retaining member 15 secured in the male-side passage 12; a male-side slide valve element 16 retained by the valve element retaining member 15 in the male-side passage 12 displaceably in the direction of a longitudinal axis L of the male-side passage 12; and a spring 20 urging the slide valve element 16 to press against a valve seat portion 18 of the male coupling body 14 to thereby close the male-side passage 12. In addition, the male coupling body 14 has a locking projection (to-be-locked portion) 22 formed on an outer peripheral surface 14a thereof to project radially outward.

As further shown in FIG. 1B, the female coupling member 30 includes the following constituent elements: a cylindrical female coupling body 34 having a female-side passage 32 extending from a front end opening 32a to a rear end opening 32b; a chuck member 36 disposed radially outside of the female coupling body 34 so as to extend forward (rightward as seen in the figure) beyond the front end opening 32a; a cylindrical displacement blocking member 38 attached to the female coupling body 34 so as to cover the chuck member 36 from radially outside; and an operating member 40 for displacing the chuck member 36 in a longitudinal direction.

Figure 2:
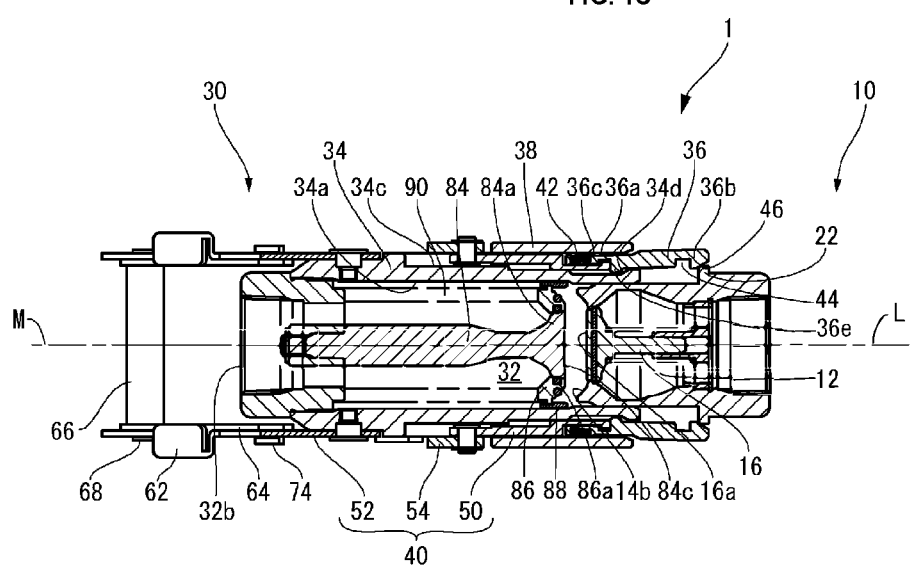
FIG. 2 is a cross-sectional view of the pipe coupling of FIG. 1B showing a state where a male coupling member is in the middle of being temporarily connected to a female coupling member.

The chuck member 36 has a rear end portion 36a retained by a chuck retaining member 50 of an operating member 40 (explained in greater detail below) and a front end portion 36b extending forward beyond the front end opening 32a of the female coupling body 34. The chuck member 36 has a ring spring 42 disposed on an outer surface 36c of the rear end portion 36a. The ring spring 42 urges the chuck member 36 radially inward. In the state shown in FIG. 1B, the chuck member 36 is held by the ring spring 42 in a position (locking position) where the chuck member 36 extends substantially parallel to a longitudinal axis M. The chuck member 36 has a locking groove 44 formed on an inner surface 36d of the front end portion 36b. The locking groove 44 is shaped to lock the locking projection 22 of the male coupling member 10. The chuck member 36 further has an inclined surface 46 formed forward of the locking groove 44. The inclined surface 46 is inclined outward toward the forward direction. When a radially outward force acts on the front end portion 36b of the chuck member 36, which is held at the rear end portion 36a by the ring spring 42, as shown in FIG. 2, the front end portion 36b is displaced radially outward to reach a position (unlocking position) where the chuck member 36 is inclined as a whole. The chuck member 36 is also displaceable in the longitudinal direction along the longitudinal axis M by an operating member 40 (explained in greater detail below), i.e. displaceable rearward (rightward as seen in the figure) from a temporarily connecting position shown in FIG. 1B to a connecting position shown in FIG. 4B. The chuck member 36 is also displaceable further forward from the temporarily connecting position to a disconnecting position shown in FIG. 5B.

The displacement blocking member 38, which is disposed outside the chuck member 36, retains the chuck member 36 from radially outside such that, when the chuck member 36 is in the temporarily connecting position (FIGS. 1B, 2 and 3B), the displacement blocking member 38 allows the chuck member 36 to be displaced radially outward from the locking position (FIGS. 1B and 3B) to the unlocking position (FIG. 2), and when the chuck member 36 is displaced rearward to the connecting position (FIG. 4B), the displacement blocking member 38 blocks the chuck member 36 from being displaced from the locking position to the unlocking position. It should be noted that the displacement blocking member 38 is secured to the female coupling body 34 by two screws 48 located at respective positions spaced from each other in the vertical direction as seen in FIG. 1A.

The operating member 40 for operating the chuck member 36 has, as shown in FIGS. 1A and 1B, a chuck retaining member 50 retaining the chuck member 36 in the longitudinal direction, a lever 52 pivotably attached to the female coupling body 34 by a pivot shaft 56 comprising a shoulder screw, and a link member 54 connecting the chuck retaining member 50 and the lever 52. The link member 54 is, as shown in FIG. 1A, pivotably connected at a rear end 54a thereof to the lever 52 by a pivot shaft 58 at a position spaced from the pivot shaft 56 of the lever 52 outwardly in the radial direction of the pivot shaft 56, and the link member 54 is pivotably connected at a front end 54b thereof to the chuck retaining member 50 by a pivot shaft 60. Pivoting the lever 52 causes the chuck retaining member 50 to be displaced in the longitudinal direction through the link member 54, and the chuck member 36, which is retained by the chuck retaining member 50, is displaced in the longitudinal direction in association with the displacement of the chuck retaining member 50.

Figure 1C:
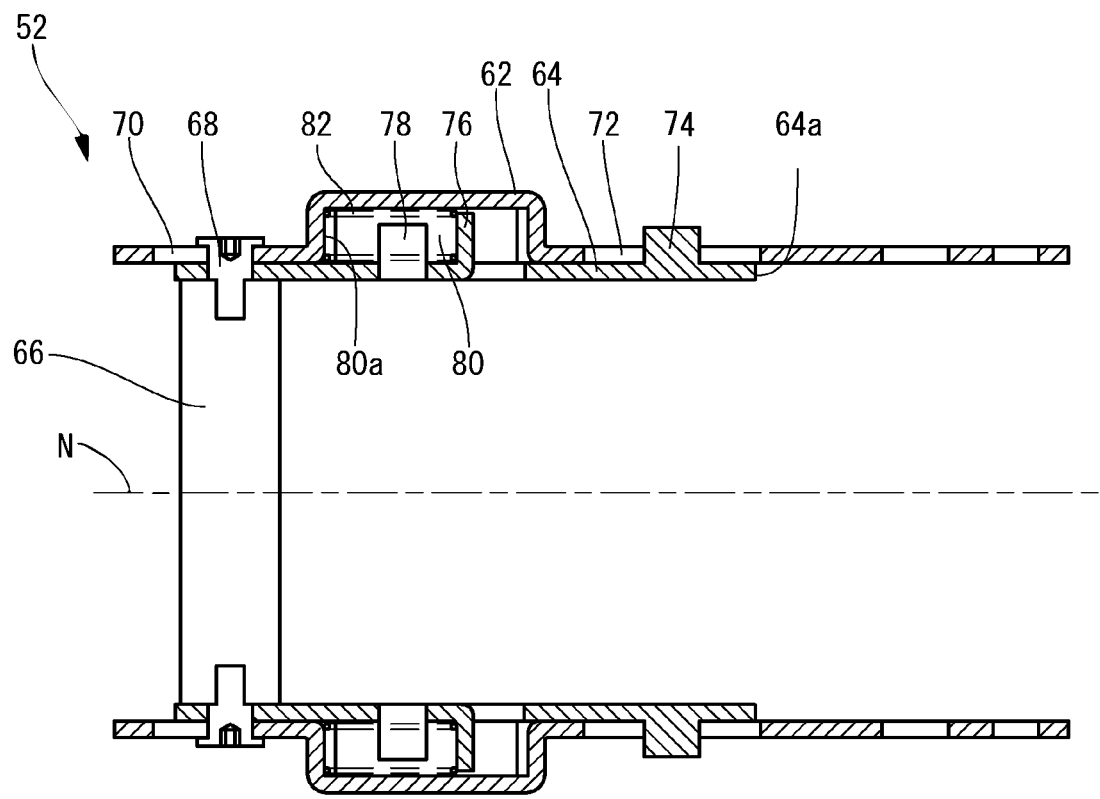
FIG. 1C is a cross-sectional view of a lever taken along the line II-II in FIG. 1A.

As shown in FIG. 1C, the lever 52 has a pair of lever bodies 62, lock members 64 attached to the lever bodies 62, respectively, and a handle 66 connecting the two lock members 64. The lock members 64 and the handle 66 are secured to each other by shoulder screws 68. The shoulder screws 68 are located in slots 70 in the lever bodies 62, respectively. The lock members 64 have sliding support portions 74 projecting outward through openings 72 in the lever bodies 62, respectively. By the shoulder screws 68 and the sliding support portions 74, the lock members 64 are mounted displaceably in the direction of a longitudinal axis N relative to the lever bodies 62. Each lock member 64 has a spring support portion 76 and a spring guide portion 78, each of which is formed by bending a part of the lock member 64. Each lever body 62 has a recess 80 formed by bending a part thereof. In the recess 80 of each lever body 62, a spring 82 is set between an inner surface 80a of the recess 80 and the spring support portion 76 of the associated lock member 64. The spring 82 urges the lock member 64 rightward as seen in FIG. 1C relative to the associated lever body 62. It should be noted that there is one spring guide portion 78 formed at each side of the spring 82 to retain the spring 82 so that the spring 82 cannot be dislodged.

The female coupling member 30 further includes, as shown in FIG. 1B, a valve seat member 84 located in the center of the female-side passage 32, and an annular slide valve element 86 disposed in the female-side passage 32 displaceably in the longitudinal direction along the longitudinal axis M of the female-side passage 32. The slide valve element 86 slides relative to an inner peripheral surface 34a of the female coupling body 34 through a sliding member 88 made of a resin. The slide valve element 86 is displaceable between a closed position (FIG. 1B) where the slide valve element 86 sealingly engages a valve seat portion 84a of the valve seat member 84 to close the female-side passage 32 between the front end opening 32a and the rear end opening 32b and an open position (FIG. 4B) where the slide valve element 86 is displaced from the closed position rearward (leftward as seen in the figure) along the longitudinal axis M of the female-side passage 32 to provide communication between the front end opening 32a and the rear end opening 32b. The slide valve element 86 is connected to a proximal portion 84b of the valve seat member 84 through a metallic bellows (urging member) 90 expanding and contracting in the direction of the longitudinal axis M. The bellows 90 urges the slide valve element 86 forward toward the closed position. The bellows 90 is structured not to pass fluid therethrough. Therefore, the fluid passes through the inside of the bellows 90 and does not contact the inner peripheral surface 34a of the female coupling body 34.

Figure 3B:
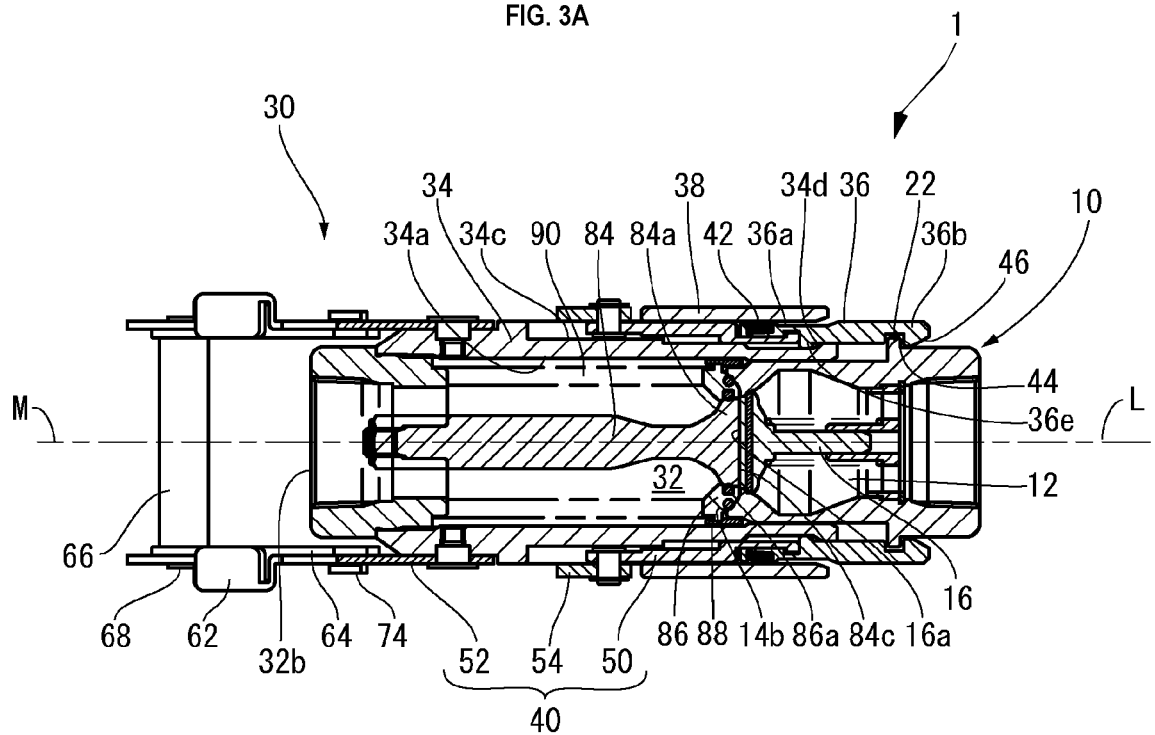
FIG. 3B is a cross-sectional view taken along the line III-III in FIG. 3A.
Figure 4A:
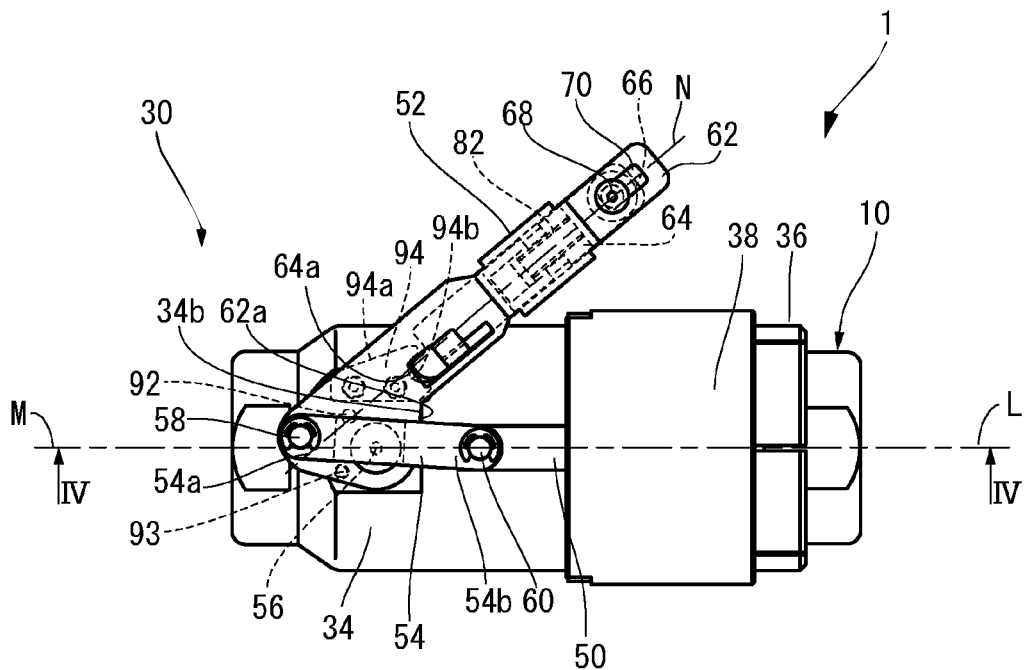
FIG. 4A is a side view of the pipe coupling of FIG. 1A in a connected state, showing a state where a lock member of the lever is in a holding position.
Figure 4B:
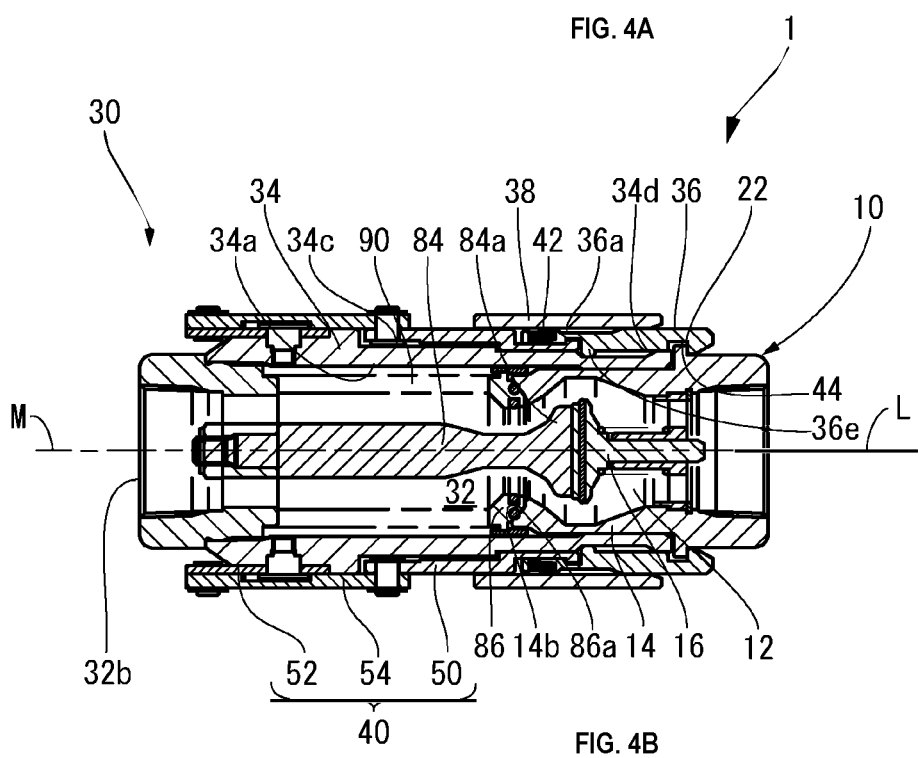
FIG. 4B is a cross-sectional view taken along the line IV-IV in FIG. 4A.

The female-side slide valve element 86 has a front end surface 86a formed into an inclined surface gradually reduced in diameter radially inward toward the forward direction. The male coupling body 14 has a rear end surface 14b formed into an inclined surface gradually reduced in diameter radially inward toward the forward direction substantially at the same angle, or a similar angle, as the front end surface 86a of the female-side slide valve element 86. When the male coupling member 10 is temporarily connected or finally connected to the female coupling member 30, as shown in FIGS. 3B and 4B, the front end surface 86a of the female-side slide valve element 86 and the rear end surface 14b of the male coupling body 14 abut against each other with substantially no gap therebetween and thus sealingly engage each other. If there is a cut on the rear end surface 14b, which serves as a seal surface, it may be difficult to provide satisfactory sealing between the rear end surface 14b and the female-side slide valve element 86. In this regard, however, a recess is formed by the rear end surface 14b of the male coupling body 14 and the male-side slide valve element 16, and the rear end surface 14b is formed so as to face radially inward in the recess. Therefore, it is unlikely that the rear end surface 14b may be damaged by collision with another member. In addition, a smoothly continuous concave surface is formed by the rear end surface 14b of the male coupling body 14 and a rear end surface 16a of the male-side slide valve element. Thus, a structure having gaps and angular portions eliminated as much as possible is provided, which facilitates washing needed when the internal fluid or the like has adhered thereto.

When the male coupling member 10 and the female coupling member 30 are to be connected together, first, the lever 52 is placed in a first pivoting position shown in FIG. 1A to set the chuck member 36 in a temporarily connecting position. At this time, a ball plunger (not shown) is engaged in a plunger receiving recess 92 of the lever 52 to suppress pivoting of the lever 52. In this state, the male coupling member 10 is inserted into the female-side passage 32 from the front end opening 32a of the female coupling body 34. Consequently, as shown in FIG. 2, the locking projection 22 of the male coupling member 10 abuts against the inclined surface 46 of the chuck member 36, causing the chuck member 36 to be displaced radially outward to reach an unlocking position. When the locking projection 22 of the male coupling member 10 reaches the locking groove 44 of the chuck member 36 as a result of the male coupling member 10 being further inserted, as shown in FIG. 3B, the chuck member 36 is displaced radially inward to return to the locking position by the urging force of the ring spring 42. At this time, the locking projection 22 is received in the locking groove 44 to restrict the position of the male coupling member 10 in the longitudinal direction relative to the chuck member 36. Thus, the female coupling member 30 and the male coupling member 10 are temporarily connected to each other. At this time, a surface comprising the rear end surface 14b of the male coupling body 14 and the rear end surface 16a of the male-side slide valve element 16 and a surface comprising the front end surface 86a of the female-side slide valve element 86 and a front end surface 84c of the valve seat portion 84a abut against each other with no gap therebetween.

Figure 3A:
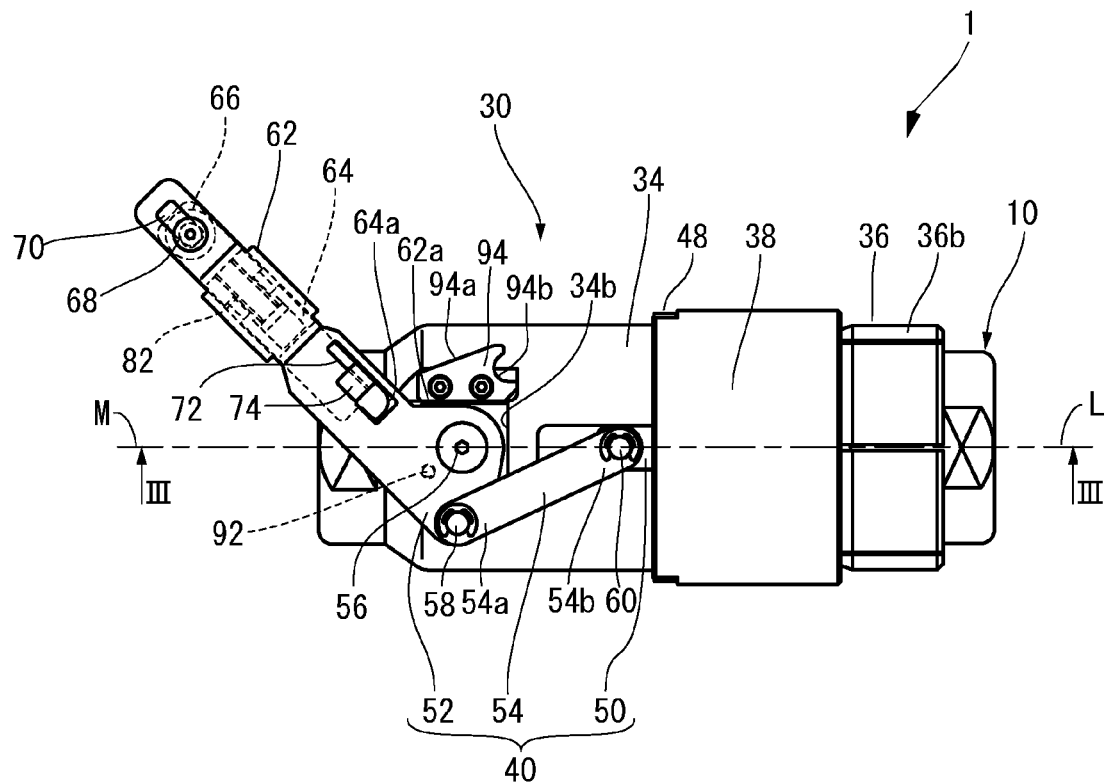
FIG. 3A is a side view of the pipe coupling of FIG. 1A in a temporarily connected state.

When the lever 52 is pivoted from the position shown in FIG. 3A clockwise, the chuck member 36 is displaced rearward to draw the male coupling member 10 into the female-side passage 32. When the lever 52 is pivoted to a second pivoting position shown in FIG. 4A, the chuck member 36 reaches a connecting position shown in FIG. 4B. At this time, the slide valve element 86 of the female coupling member 30 is displaced to an open position by being pressed by the rear end surface 14b of the male coupling body 14, and the slide valve element 16 of the male coupling member 10 is displaced to an open position by being pressed by the valve seat member 84 of the female coupling member 30. Consequently, the female-side passage 32 and the male-side passage 12 communicate with each other. Thus, a connected state is established.

In the above-described process of pivoting the lever 52 from the first pivoting position to the second pivoting position to shift the pipe coupling 1 from the temporarily connected state to the connected state, a distal end portion 64a of each lock member 64 of the lever 52 slides on an inclined sliding engagement surface 94a of a lever holding member 94 secured to the female coupling body 34. Consequently, the lock member 64 is gradually displaced outward in the pivoting direction of the lever 52 against the urging force of the spring 82. When the lever 52 reaches the second pivoting position, as shown in FIG. 4A, the lock member 64 is displaced inward in the pivoting direction by the urging force of the spring 82, and the distal end portion 64a is locked in a locking recess 94b of the lever holding member 94. When the lock member 64 is in this holding position, the lever 52 cannot be pivoted toward the first pivoting position by the interference of the lock member 64 with the lever holding member 94. Accordingly, the lever 52 is held in the second pivoting position and inhibited from being accidentally pivoted to the first pivoting position, which would otherwise disconnect the male and female coupling members 10 and 30 undesirably. It should be noted that, at this time, a ball plunger (not shown) is engaged in another plunger receiving recess 93 of the lever 52 to suppress pivoting of the lever 52. In addition, the arrangement is such that, if the lever 52 is forced to pivot from the second pivoting position further clockwise as seen in the figure, an abutment surface 62a of the lever body 62 abuts against an abutment surface 34b of the female coupling body 34, thereby stopping the lever 52 from pivoting any further.

In the process of reaching the connected state from the temporarily connected state, the pivot shaft 58 provided at the rear end 54a of the link member 54 relative to the lever 52 moves from the lower side to the upper side, as seen in FIG. 4A, across a plane (plane extending in the depth direction along the longitudinal axis in the figure) passing through the pivot shaft 56 of the lever 52 relative to the female coupling body 34 and the pivot shaft 60 provided at the front end 54b of the link member 54 relative to the chuck retaining member 50. Consequently, in the connected state, when the chuck member 36 receives a forward force as a result of the female coupling member 30 and the male coupling member 10 receiving force that urges the coupling members 30 and 10 to separate from each other, the lever 52 is subjected to a clockwise force as seen in the figure through the link member 54. Accordingly, even when the female coupling member 30 and the male coupling member 10 receive force that urges the coupling members 30 and 10 to separate from each other, the lever 52 does not pivot, and the chuck member 36 cannot be displaced forward to return to the temporarily connected state.

Figure 4C:
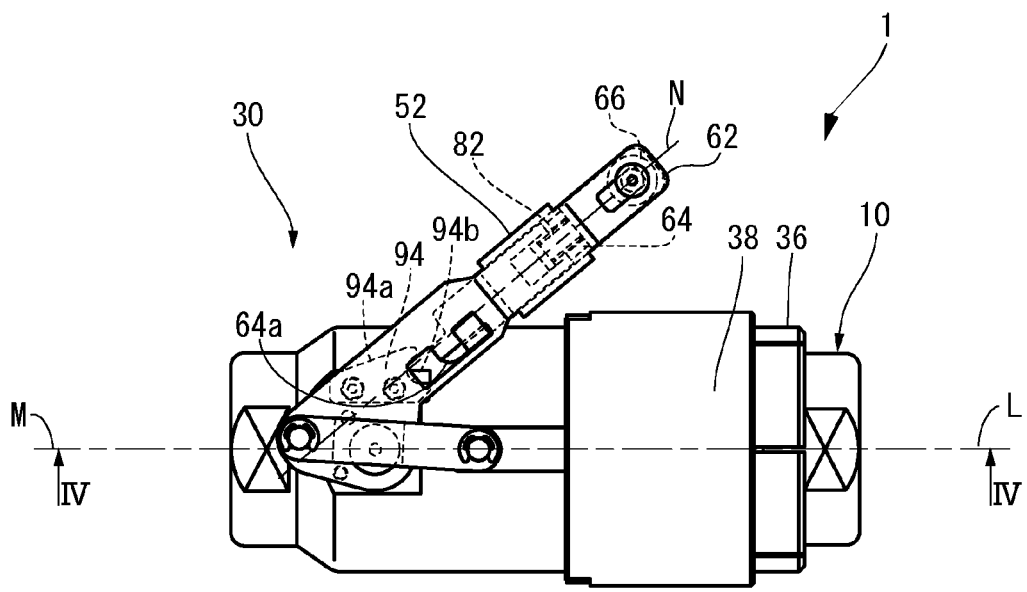
FIG. 4C is a side view of the pipe coupling of FIG. 1A in the connected state, showing a state where the lock member of the lever is in a releasing position.
Figure 5A:
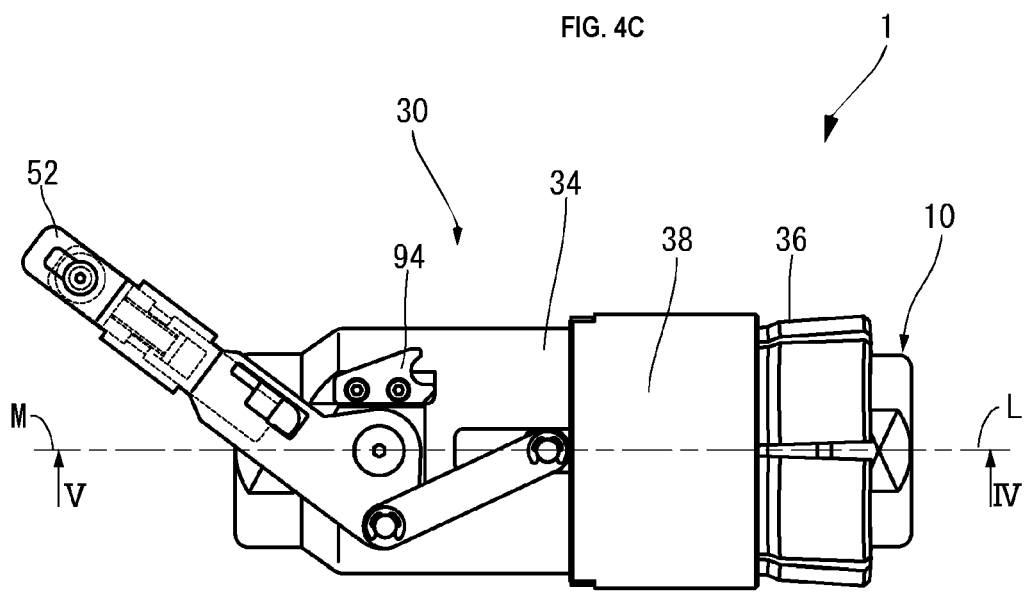
FIG. 5A is a side view of the pipe coupling of FIG. 1A in a disconnected state.
Figure 5B:
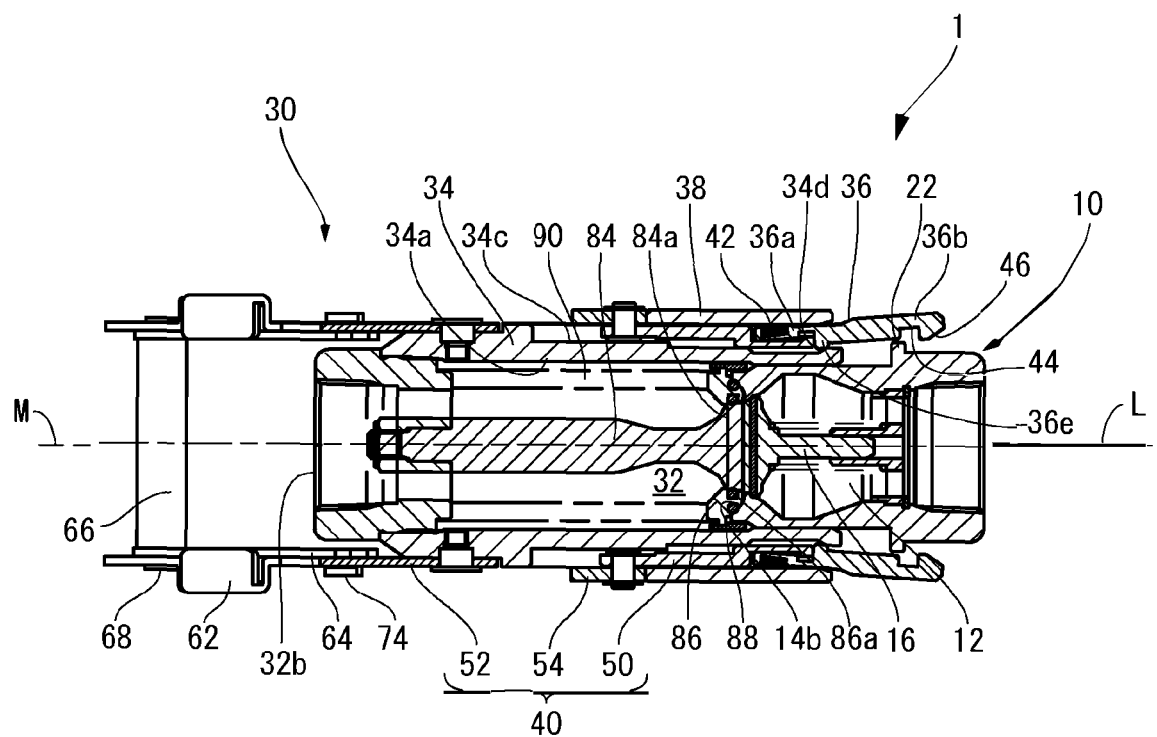
FIG. 5B is a cross-sectional view taken along the line V-V in FIG. 5A.

To disconnect the female coupling member 30 and the male coupling member 10, first, as shown in FIG. 4C, the handle 66, which is secured to the lock member 64 of the lever 52, is pulled outward in the pivoting direction to displace the lock member 64 away from the lever holding member 94 to an unlocking position where the distal end portion 64a disengages from the locking recess 94b. When the lever 52 is pivoted to the first pivoting position with the lock member 64 held in the unlocking position, the pipe coupling 1 returns to the temporarily connected state shown in FIGS. 3A and 3B. When the lever 52 is further pivoted counterclockwise to a third pivoting position shown in FIG. 5A, the chuck member 36 is further displaced forward. At this time, as shown in FIG. 5B, an inward projection 36e of the chuck member 36 rides onto an inclined portion 34d of an outer peripheral surface 34c of the female coupling body 34. Consequently, the chuck member 36 receives a radially outward force to reach an unlocking position where the front end portion 36b, which has the locking groove 44, is displaced radially outward. Thus, the locking projection 22 of the male coupling member 10 and the locking groove 44 are disengaged from each other, resulting in a state where the male coupling member 10 is detachable from the female coupling member 30.

It should be noted that the operating direction of the handle 66 when displacing the lock member 64 from the holding position (FIG. 4A) to the releasing position (FIG. 4C) is offset from the radial direction from the pivot center of the lever 52. That is, the longitudinal axis N of the lock member 64, which coincides with the operating direction of the handle 66, does not pass through the pivot center of the lever 52 but passes through a point rearward of the pivot center. When the handle 66 is operated to displace the lock member 64 from the holding position to the releasing position, the lever body 62 receives an upward force in the direction of the longitudinal axis N through the spring 82, and the force produces a turning moment causing the lever 52 to pivot in a direction away from the first pivoting position (i.e. in a clockwise direction as seen in the figure). Accordingly, when the lock member 64 is displaced from the holding position to the releasing position by operating the handle 66, the handle operating force cannot pivot the lever 52 toward the first pivoting position. With this structure, when the handle 66 is accidentally operated, the lever 52 is inhibited from pivoting at the same time as the operation of the handle 66, which would otherwise unexpectedly disconnect the female coupling member 30 and the male coupling member 10 from each other.

The pipe coupling 1 is configured such that, when the pipe coupling 1 is shifted from the connected state (FIGS. 4A and 4B) to the temporarily connected state (FIGS. 3A and 3B) in the process of disconnecting the female and male coupling members 30 and 10 from each other, both the slide valve element 86 of the female coupling member 30 and the slide valve element 16 of the male coupling member 10 are placed in the respective closed positions in a state where the sealing engagement between the rear end surface 14b of the male coupling member 10 and the slide valve element 86 is maintained. In addition, in the temporarily connected state, no gap is formed between the rear end surface 14b of the male coupling member 10 and the slide valve element 86 of the female coupling member 30 and between the slide valve element 86 of the female coupling member 30 and the slide valve element 16 of the male coupling member 10. With this structure, the internal fluid is inhibited from leaking to the outside when the male coupling member 10 is detached from the female coupling member 30. In actual practice, however, it is impossible to eliminate a gap completely, and the internal fluid may enter such a gap and leak to the outside when the male coupling member 10 is detached from the female coupling member 30. If the leaking fluid is of a high viscosity, the fluid may solidify with the passage of time. If the leaking fluid is a corrosive fluid such as an electrolyte, the coupling member may be corroded. In a conventional coupling member using a locking element, the locking element, which is movable, is disposed near the area of sealing engagement between the coupling members; therefore, the leaking fluid is likely to adhere to the locking element. Further, because the locking element is held in a tapered through-hole, it is difficult to remove the fluid entering the area between the locking element and the through-hole. If the fluid adhering to the locking element is left as it is, the fluid may solidify, or the locking element may be corroded, so that the locking element may fail to operate normally, and it may become impossible to connect and disconnect the coupling members. In contrast to this, the female coupling member 30 has the chuck member 36, which is a movable member, disposed outside the female coupling body 34. Therefore, even if the internal fluid leaks, the possibility of the leaking fluid reaching the chuck member 36 is substantially reduced. Accordingly, the likelihood of the chuck member 36 becoming stuck by the leaking internal fluid is decreased, and thus malfunction is inhibited.

FIGS. 6A to 10 show a pipe coupling 101 according to a second form of the present disclosure. In the following, a description of similar structures as those of the pipe coupling 1 according to the first form is omitted, and structures of the pipe coupling 101 that differ from those of the pipe coupling 1 will be explained in detail.

Figure 6A:
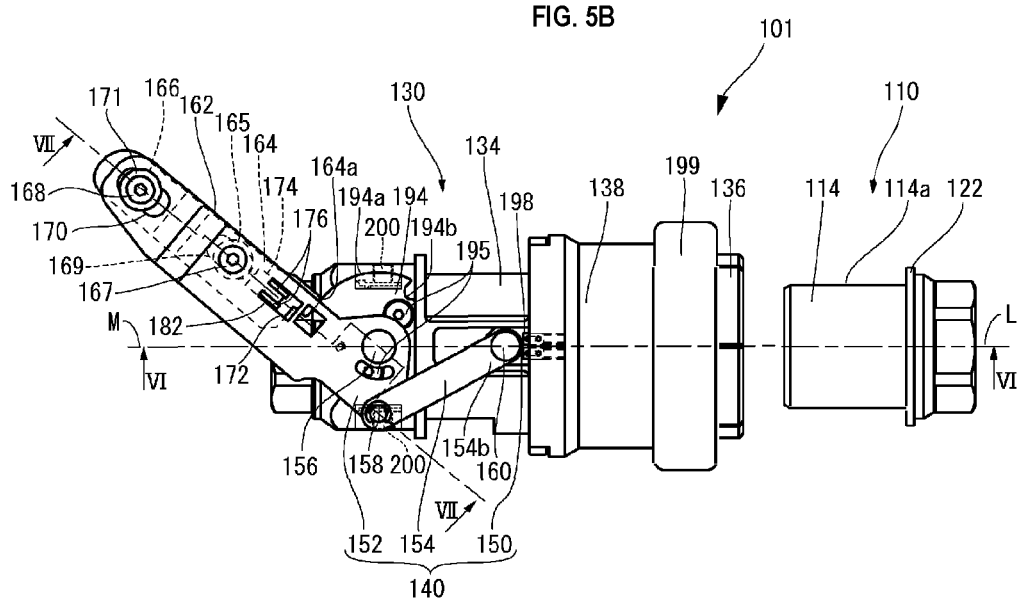
FIG. 6A is a side view of a pipe coupling in an unconnected state according to a second form of the present disclosure.
Figure 6B:
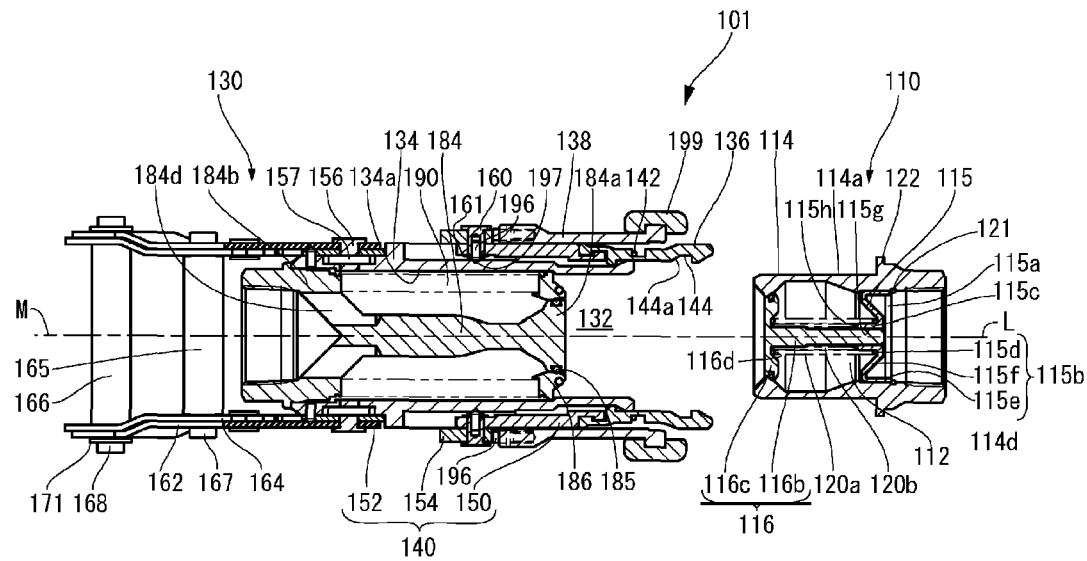
FIG. 6B is a cross-sectional view taken along the line VI-VI in FIG. 6A.

As shown in FIG. 6B, the pipe coupling 101 has a male coupling member 110 including a cylindrical male coupling body 114 having a male-side passage 112, a valve element retaining member 115 secured in the male-side passage 112, a slide valve element 116 retained by the valve element retaining member 115 in the male-side passage 112, and first and second coil springs 120a and 120b urging the slide valve element 116.

Figure 7:
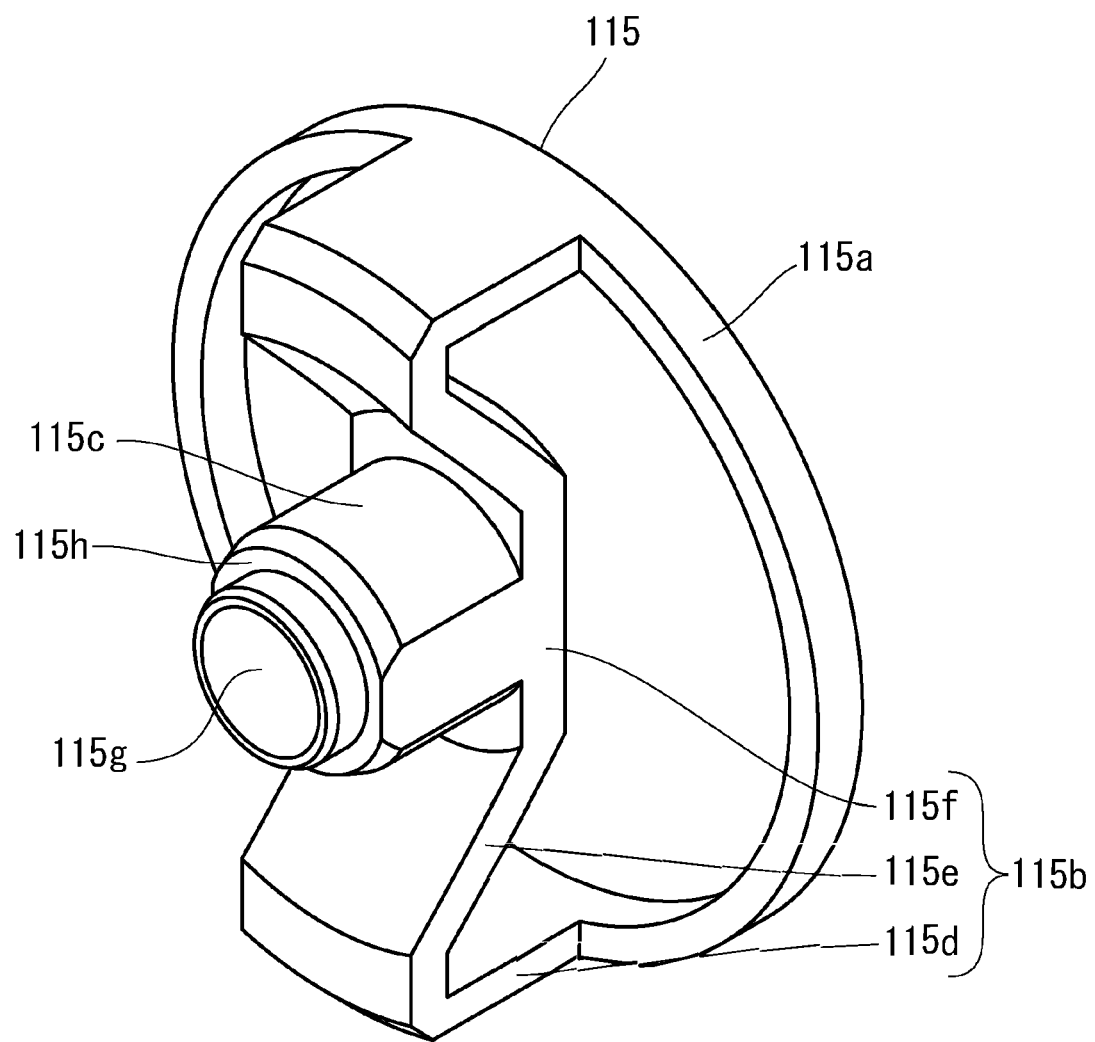
FIG. 7 is a perspective view of a valve element retaining member of a male pipe coupling member in FIG. 6A.
Figure 8:
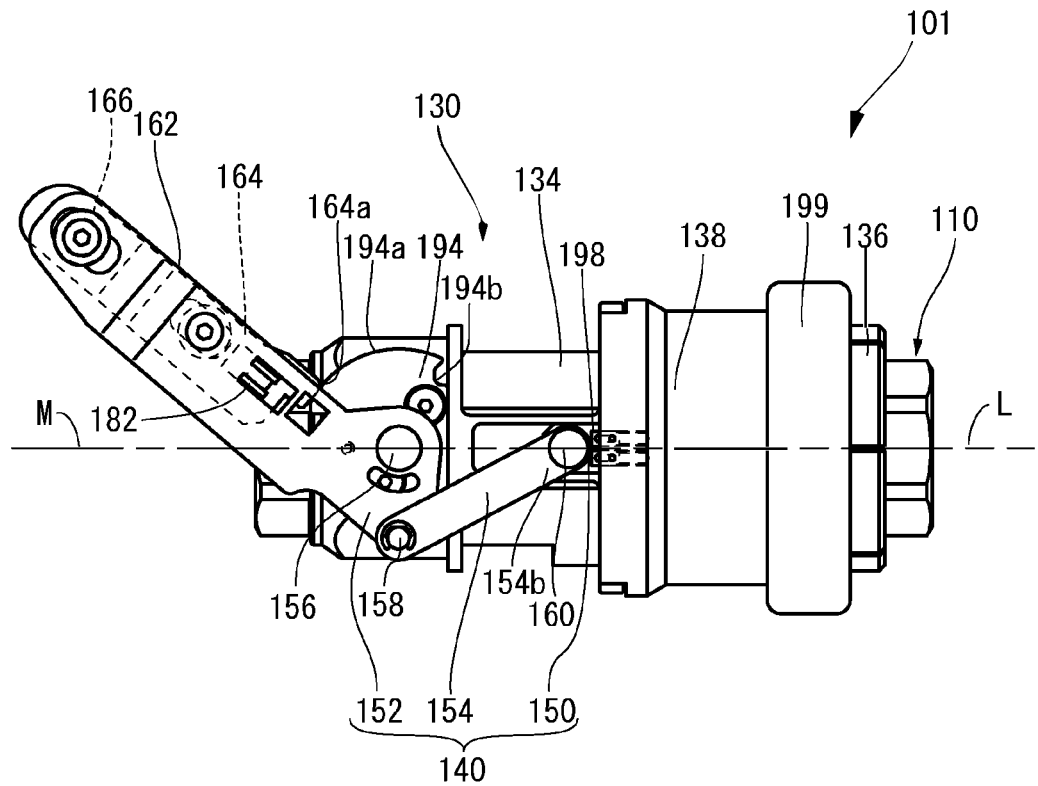
FIG. 8 is a side view of the pipe coupling of FIG. 6A in a temporarily connected state.
Figure 9:
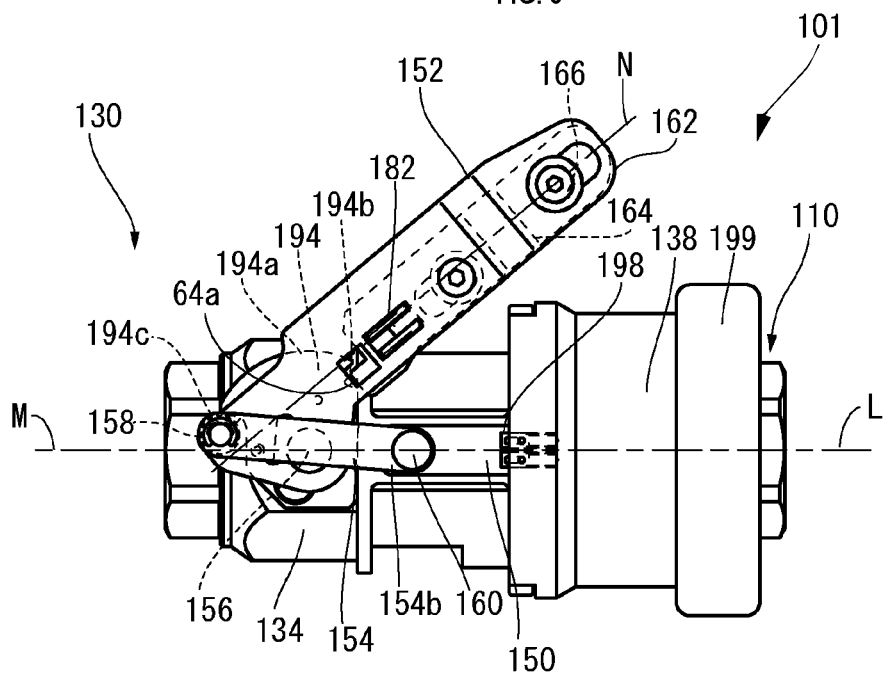
FIG. 9 is a side view of the pipe coupling of FIG. 6A in a connected state.
Figure 10:
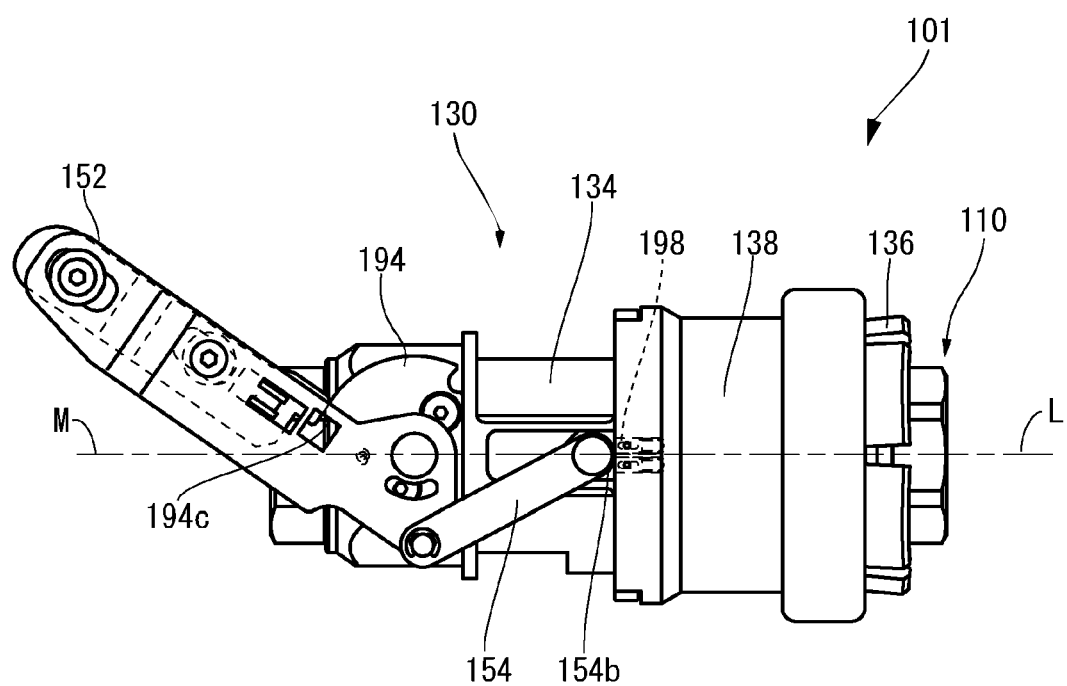
FIG. 10 is a side view of the pipe coupling of FIG. 6A in a disconnected state.

As shown in FIGS. 6B and 7, the valve element retaining member 115 comprises an annular secured portion 115a secured to an inner peripheral surface 114d of the male coupling body 114, a support portion 115b traversing the annular secured portion 115a diametrically, and a spring retaining portion 115c extending from the center of the support portion 115b rearward (leftward as seen in the figures) in the direction of a longitudinal axis L. The support portion 115b comprises first regions 115d extending from the annular secured portion 115a along the inner peripheral surface 114d of the male coupling body 114, second regions 115e extending from the first regions 115d, respectively, obliquely forward toward the radially inward direction, and a third region 115f extending between the two second regions 115e. Thus, the support portion 115b has an M-shaped configuration as a whole. The valve element retaining member 115 is secured to the male coupling body 114 by a stop ring 121. In the secured state, the valve element retaining member 115 has the first regions 115d of the support portion 115b disposed along the inner peripheral surface 114d of the male coupling body 114. Therefore, the valve element retaining member 115 is stably held with respect to the male coupling body 114. Further, the spring retaining portion 115c has a through-hole 115g formed in the center thereof to receive a shaft portion 116b of the male-side slide valve element 116.

The male-side slide valve element 116 comprises, as shown in FIG. 6B, a shaft portion 116b and a disk-shaped lid portion 116c. The lid portion 116c has an annular groove 116d formed at a joint thereof where the lid portion 116c joins with the shaft portion 116b. The first coil spring 120a is disposed between the annular groove 116d of the male-side slide valve element 116 and the second regions 115e of the support portion 115b of the valve element retaining member 115. The second coil spring 120b is smaller in diameter than the first coil spring 120a and coaxially disposed inside the first coil spring 120a between the annular groove 116d of the male-side slide valve element 116 and a step portion 115h of the spring retaining portion 115c of the valve element retaining member 115. It is possible to increase the length of the first coil spring 120a by providing the annular groove 116d in the slide valve element 116 and by forming the support portion 115b of the valve element retaining member 115 into an M shape. Thus, it is possible to sufficiently increase the urging force for the slide valve element 116 while providing the amount of stroke desired for the slide valve element 116. Further, in addition to the first coil spring 120a, the second coil spring 120b is coaxially disposed therein, thereby further increasing the urging force for the slide valve element 116 so that the slide valve element 116 cannot be displaced easily even if the slide valve element 116 is accidentally pushed from the outside during washing the male coupling member 110, for example. In the male coupling member 10 of the first form, the male coupling body 14 has a step portion 14c (FIG. 1B) formed on the outer peripheral surface 14a at a rear end thereof in order to avoid an interference between the male coupling member 10 and the sliding member 88, which is attached to the female-side slide valve element 86, when the male coupling member 10 is connected to the female coupling member 30. In this regard, the second form need not have a step portion on an outer peripheral surface 114a of the male coupling body 114 because the female coupling member 130 is structured to have no sliding member, as will be described in greater detail below. Accordingly, the outer peripheral surface 114a presents a less uneven surface. Thus, the internal fluid and other dirt adhering to the outer peripheral surface 114a can be removed even more easily.

In the female coupling member 130 of the second form, as shown in FIG. 6B, a chuck member 136 has a locking groove 144 having a rear side surface formed into an inclined surface 144a gradually reduced in diameter toward the rearward direction. Therefore, when the chuck member 136 is displaced radially outward to an unlocking position by pivoting a lever 152 from a first pivoting position (FIG. 8) to a third pivoting position (FIG. 10) in a state where the male coupling member 110 is connected to the female coupling member 130, the locking groove 144 of the chuck member 136 is inhibited from catching a locking projection 122 of the male coupling member 110, which would otherwise interfere with the displacement of the chuck member 136. In addition, an even simpler ring spring 142, which is wound approximately only one turn, is used as an urging member for urging the chuck member 136 radially inward. The ring spring 142 is the one usually used as a stop ring to secure a member.

An operating member 140 for operating the chuck member 136 has, as shown in FIGS. 6A and 6B, a chuck retaining member 150 retaining the chuck member 136 in the longitudinal direction, a lever 152 pivotable relative to a female coupling body 134, and a link member 154 connecting the chuck retaining member 150 and the lever 152. Between the lever 152 and the male coupling body 114 is disposed a lever holding member 194 secured to the male coupling body 114 by two screws 195. The lever 152 is attached to the lever holding member 194. Specifically, a pivot shaft 156 is inserted from the outside of the lever 152 so as to extend through the lever 152 and the lever holding member 194, and a pin 157 is fitted to the pivot shaft 156 at a position inside the lever holding member 194 to retain the pivot shaft 156. Thus, the lever 152 is rotatable about the pivot shaft 156 relative to the female coupling body 134 through the lever holding member 194. In the first form, the pivot shaft 56 is a shoulder screw and engaged with the female coupling body 34. In that case, the engagement between the pivot shaft 56 and the female coupling body 34 may be loosened as the lever 52 is pivoted repeatedly, and the pivot shaft 56 may be dislodged. In this regard, the above-described structure in which the pivot shaft 156 is secured by the pin 157 reduces the possibility of dislodgement of the pivot shaft 156.

A pivot shaft 160 pivotably connects a front end 154b of the link member 154 and the chuck retaining member 150. As shown in FIG. 6B, the pivot shaft 160 is retained by attaching an E-shaped snap ring 161 to the pivot shaft 160 at a position inside the chuck retaining member 150. By disposing the E-shaped snap ring 161 at a position where the E-shaped snap ring 161 is not exposed to the outside, it is possible to inhibit the E-shaped snap ring 161 from coming off unintentionally by collision with another member, for example, which would otherwise cause the pivot shaft 160 to be dislodged undesirably. In addition, the pivot shaft 160 has a ball plunger 196 embedded therein. When the lever 152 is in the first pivoting position, the ball plunger 196 is engaged in a plunger receiving recess 197, which is formed on the outer peripheral surface of the female coupling body 134, to suppress pivoting of the lever 152 from the first pivoting position.

Figure 6C:
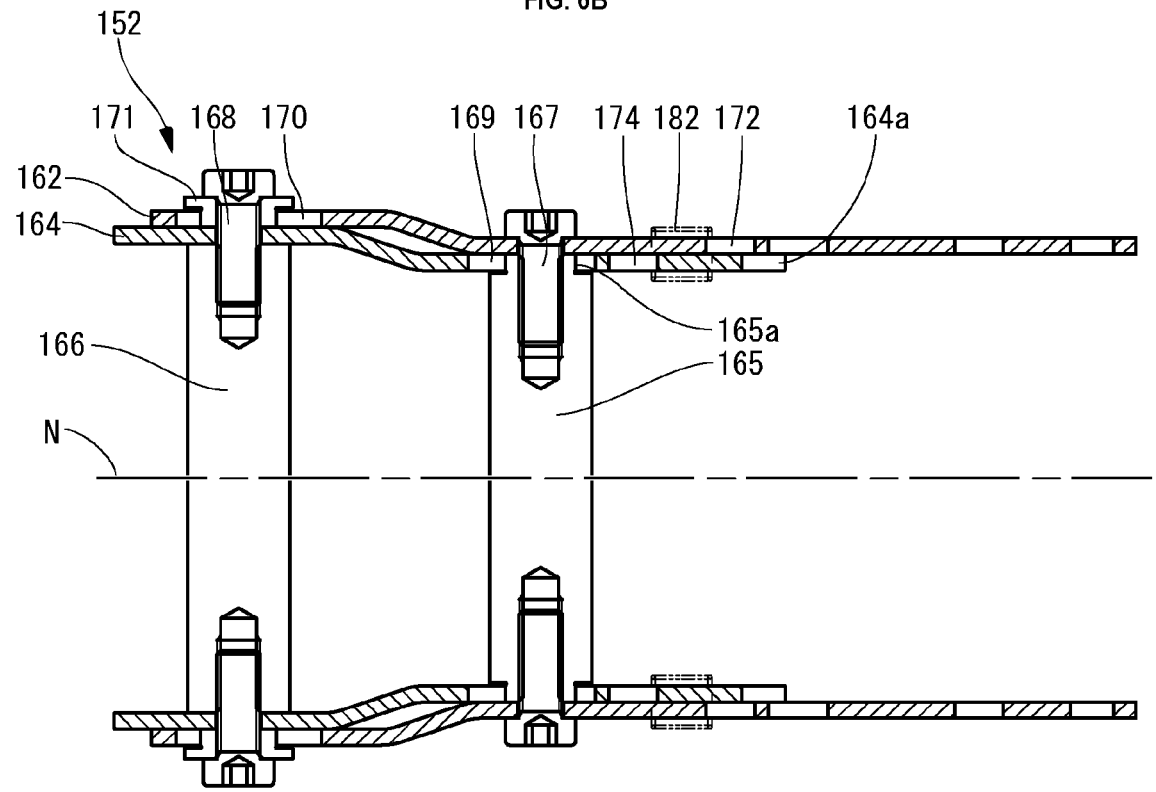
FIG. 6C is a cross-sectional view of a lever taken along the line VII-VII in FIG. 6A.

The lever 152 has, as shown in FIG. 6C, a pair of lever bodies 162, lock members 164 attached to the lever bodies 162, respectively, a connecting shaft 165 connecting the lever bodies 162, and a handle 166 connecting the two lock members 164. The connecting shaft 165 has a stepped configuration having small-diameter portions 165a at both ends thereof. The connecting shaft 165 is configured such that, when the connecting shaft 165 is secured to the lever bodies 162 by screws 167, the small-diameter portions 165a are located in slots 169 in the lock members 164, respectively. The lock members 164 and the handle 166 are secured to each other by screws 168 with spacers 171 interposed therebetween. The spacers 171 are located in slots 170 in the lever bodies 162, respectively. The small-diameter portions 165a of the connecting shaft 165 and the spacers 171 are retained displaceably in the direction of a longitudinal axis N in the slots 169 in the lock members 164 and in the slots 170 in the lever bodies 162, respectively. With this structure, the lock members 164 are displaceable in the direction of the longitudinal axis N, together with the handle 166, relative to the lever bodies 162. As will also be clear from FIG. 6A, each lever body 162 is formed with a first opening 172 comprising portions extending in the direction of the longitudinal axis N and a portion connecting these portions, and each lock member 164 is also formed with a second opening 174 having a configuration similar to that of the first opening 172 but opposite thereto in the direction of the longitudinal axis N. The first opening 172 and the second opening 174 are formed at respective positions where the openings 172 and 174 partly overlap each other, and form two communicating holes 176 at their overlapping portions. Springs 182 are disposed to extend through the communicating holes 176. The springs 182 urge the lock members 164 toward the axis of rotation of the lever 152 (rightward as seen in FIG. 6C) in the direction of the longitudinal axis N relative to the lever bodies 162.

While the lever 152 is pivoting from the first pivoting position (FIG. 8) to the second pivoting position (FIG. 9), a distal end portion 164a of each lock member 164 of the lever 152 slides on a sliding engagement surface 194a of the lever holding member 194, which is secured to the female coupling body 134. The sliding engagement surface 194a is in the shape of a circular arc centered on the pivot shaft 156 of the lever 152. Therefore, the lock member 164 is held in a fixed position relative to the lever body 162 and not displaced until the lever 152 reaches the second pivoting position. When the lever 152 reaches the second pivoting position, the lock member 164 is displaced inward in the pivoting direction by the urging force of the springs 182, and the distal end portion 164a of the lock member 164 is locked in a locking recess 194b of the lever holding member 194. Thus, the lever 152 is held in the second pivoting position. If the lever 152 is forced to further pivot clockwise as seen in the figure from the second pivoting position, a pivot shaft 158 pivotably connecting the lever 152 and the link member 154 abuts against an abutment surface 194c provided on the lever holding member 194, thereby stopping the lever 152 from pivoting any further.

A displacement blocking member 138 blocks displacement of the chuck member 136 to the unlocking position when in the connecting position. The displacement blocking member 138 has a plunger 198 attached thereto. When the lever 152 is further pivoted from the first pivoting position (FIG. 8) counterclockwise to the third pivoting position (FIG. 10), the plunger 198 is pushed in by the front end 154b of the link member 154. When the operator releases hold of the handle 166 of the lever 152 in this state, the link member 154 is pushed back by the plunger 198, and consequently, the lever 152 is returned to the first pivoting position automatically. In addition, the displacement blocking member 138 has a rubber protecting member 199 attached to the front end thereof to reduce impact on the female coupling member 130 when dropped or hit against the male coupling member 110 undesirably.

As shown in FIG. 6B, the female coupling member 130 has a valve member 184 disposed in a female-side passage 132 thereof. The valve member 184 is formed as a one-piece member integrated throughout from a valve seat portion 184a to a proximal portion 184b, thereby making it possible to enlarge a flow path opening 184d. In addition, a female-side slide valve element 186 is configured to slide in direct contact with the inner peripheral surface 134a of the female coupling body 134, thereby eliminating the sliding member 88, which is provided in the first form. Sealing engagement between the valve seat portion 184a and the female-side slide valve element 186 is made by a seal ring 185 attached to the valve seat portion 184a. Because the sliding member 88 is eliminated, the area between the female-side slide valve element 186 and the inner peripheral surface 134a of the female coupling body 134 is not sealed, and leaking internal fluid or the like may enter through the gap and collect in the space between the inner peripheral surface 134a and a bellows 190. Therefore, as shown in FIG. 6A, the female coupling body 134 is provided with washing holes 200 at upper and lower positions thereof so that the washing holes 200 extend through the female coupling body 134 to the female-side passage 132 to communicate with the space in the female-side passage 132 between the inner peripheral surface 134a and the bellows 190. From one of the washing holes 200, a fluid such as nitrogen gas or water is injected and discharged from the other washing hole 200, thereby enabling washing off of the internal liquid or the like collected between the inner peripheral surface 134a and the bellows 190 in the female-side passage 132. It should be noted that the washing holes 200 are usually closed with stoppers to inhibit entry of foreign substances through the washing holes 200.

In the pipe coupling 101 according to the second form, the male coupling member 110 and the female coupling member 130 are connected and disconnected by operations similar to those of the pipe coupling 1 according to the first form.

Although in the foregoing forms the levers 52 and 152 are used as the operating members 40 and 140 for operating the chuck members 36 and 136, respectively, it is also possible to use other structures, for example, one that operates a sleeve in the longitudinal direction. Further, although the foregoing forms are provided with the displacement blocking members 38 and 138, respectively, to inhibit the chuck members 36 and 136 from being displaced to the unlocking position when in the connecting position, the displacement blocking members 38 and 138 may be eliminated if the respective forward engagement surfaces of the locking projection 22 (122) and the locking groove 44 (144) are formed into inclined surfaces, for example, such that when the chuck member 36 is caused to be displaced radially outward, the locking groove 44 catches the locking projection 22, thereby inhibiting the chuck member 36 from being displaced outward. It should be noted that the present disclosure is applicable regardless of whether or not the coupling member concerned has a slide valve element.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The description of the disclosure is merely exemplary in nature and, thus, variations that do not depart from the substance of the disclosure are intended to be within the scope of the disclosure. Such variations are not to be regarded as a departure from the spirit and scope of the disclosure.

As used herein, the phrase at least one of A, B, and C should be construed to mean a logical (A OR B OR C), using a non-exclusive logical OR, and should not be construed to mean "at least one of A, at least one of B, and at least one of C.

What is claimed is:

1. A female coupling member detachably connectable with an associated male coupling member, the female coupling member comprising:
a cylindrical female coupling body having a female-side passage extending from a front end opening to a rear end opening, the cylindrical female coupling body being configured to receive the male coupling member into the female-side passage from the front end opening; and
a chuck member disposed radially outside of the cylindrical female coupling body and extending forward beyond the front end opening, the chuck member having a locking portion on a part thereof extending forward beyond the front end opening, the locking portion being configured to engage with a to-be-locked portion of the male coupling member, the chuck member being displaceable in a longitudinal direction between a temporarily connecting position and a connecting position which is rearward of the temporarily connecting position, the chuck member also being radially displaceable between a locking position where the locking portion locks the to-be-locked portion and an unlocking position where the locking portion is displaced radially outward from the locking position to unlock the to-be-locked portion, wherein when the chuck member is displaced from the temporarily connecting position to the connecting position in a state where the locking portion has locked the to-be-locked portion in the temporarily connecting position, the chuck member draws the male coupling member into the female-side passage to connect the male coupling member to the female coupling member.

2. The female coupling member of claim 1 further comprising:

a displacement blocking member attached to the cylindrical female coupling body so as to cover the chuck member from radially outside, the displacement blocking member being configured such that when the chuck member is in the temporarily connecting position, the displacement blocking member allows the chuck member to be displaced from the locking position to the unlocking position, and when the chuck member is in the connecting position, the displacement blocking member blocks the chuck member from being displaced from the locking position to the unlocking position.

3. The female coupling member of claim 1 further comprising an urging member urging the chuck member radially inward toward the locking position.

4. The female coupling member of claim 3, wherein the urging member is a ring spring disposed on an outer peripheral surface of the chuck member.

5. The female coupling member of claim 1, wherein the chuck member has an inclined surface on an inner surface of a front end portion thereof, the inclined surface being inclined radially outward toward a forward direction, so that, when the male coupling member is inserted into the female-side passage in a state where the chuck member is in the locking position, the male coupling member abuts against the inclined surface, causing the front end portion of the chuck member to be displaced radially outward, and thus displacing the chuck member to the unlocking position.

6. The female coupling member of claim 1, wherein the chuck member is displaceable in the longitudinal direction to a disconnecting position located forward of the temporarily connecting position, and when the chuck member is displaced from the temporarily connecting position to the disconnecting position, the chuck member is pressed radially outward at an inner surface thereof by an outer peripheral surface of the cylindrical female coupling body to reach the unlocking position.

7. The female coupling member of claim 1 further comprising an operating member engaged with the chuck member to displace the chuck member in the longitudinal direction at least between the temporarily connecting position and the connecting position.

8. The female coupling member of claim 7, wherein the operating member has a chuck retaining member retaining the chuck member in the longitudinal direction, a lever pivotable relative to the cylindrical female coupling body, and a link member connecting the chuck retaining member and the lever, the operating member being configured such that, by pivoting the lever, the chuck member is displaced in the longitudinal direction at least between the temporarily connecting position and the connecting position through the link member and the chuck retaining member.

9. The female coupling member of claim 1 further comprising:

a valve seat part secured to the cylindrical female coupling body in the female-side passage;

a female-side slide valve element disposed in the female-side passage, the female-side slide valve element being displaceable between a closed position and an open position, wherein in the closed position, the female-side slide valve element sealingly engages the valve seat part to close the female-side passage between the front end opening and the rear end opening, and in the open position, the female-side slide valve element is displaced rearward from the closed position to provide communication between the front end opening and the rear end opening; and an urging member urging the female-side slide valve element toward the closed position, wherein when the chuck member is displaced from the temporarily connecting position to the connecting position, the male coupling member locked by the chuck member presses and displaces the female-side slide valve element to the open position.

10. The female coupling member of claim 9, wherein:

the urging member is a bellows, and the cylindrical female coupling body has a washing hole extending therethrough from an inner peripheral surface to an outer peripheral surface thereof such that the washing hole communicates with a space between the inner peripheral surface and the bellows in the female-side passage.

11. A pipe coupling comprising:

the female coupling member of claim 1; and a male coupling member detachably connectable to the female coupling member, the male coupling member having a to-be-locked portion to be locked by the locking portion of the female coupling member.

12. A pipe coupling comprising a male coupling member detachably connectable to a female coupling member, the female coupling member including a cylindrical female coupling body having a female-side passage extending from a front end opening to a rear end opening, the female coupling member further including a chuck member disposed radially outside of the cylindrical female coupling body to extend forward beyond the front end opening, the chuck member having a locking groove on an inner surface thereof, the chuck member being displaceable, in a longitudinal direction, between a temporarily connecting position and a connecting position which is rearward of the temporarily connecting position, the chuck member also being radially displaceable between a locking position and an unlocking position where the locking groove is displaced radially outward from the locking position, the male coupling member comprising a cylindrical male coupling body having a male-side passage extending from a front end opening to a rear end opening, the cylindrical male coupling body having a locking projection formed on an outer peripheral surface thereof so as to project radially outwardly, the locking projection being shaped to be lockable in the locking groove of the chuck member when in the locking position, wherein when the chuck member is displaced from the temporarily connecting position to the connecting position in a state where the locking projection has been locked in the locking groove of the chuck member, the male coupling body is drawn into the female-side passage of the female coupling member, and thus the male coupling member is connected to the female coupling member.

13. The pipe coupling of claim 12, wherein the female coupling member further includes:

a valve seat part secured to the female coupling body in the female-side passage;

a female-side slide valve element disposed in the female-side passage, the female-side slide valve element being displaceable between a closed position and an open position, wherein in the closed position, the female-side slide valve element sealingly engages the valve seat part to close the female-side passage between the front end opening and the rear end opening, and in the open position, the female-side slide valve element is displaced rearward from the closed position to provide communication between the front end opening and the rear end opening; and an urging member urging the female-side slide valve element toward the closed position, wherein the female-side slide valve element has a front end surface formed into an inclined surface gradually reduced in diameter radially inward toward a forward direction, and wherein the male coupling body has a rear end surface formed into an inclined surface gradually reduced in diameter radially inward toward the forward direction at a similar angle as the front end surface of the female-side slide valve element, so that, when the male coupling body is drawn into the female-side passage of the female coupling member, the rear end surface of the male coupling body sealingly engages the front end surface of the female-side slide valve element.

14. The pipe coupling of claim 13, further comprising:

a male-side slide valve element disposed in the male-side passage, the male-side slide valve element being displaceable between a closed position and an open position, wherein in the closed position, the male-side slide valve element sealingly engages an inner peripheral surface of the male coupling body to close the male-side passage between the front end opening and the rear end opening, and in the open position, the male-side slide valve element is displaced forward from the closed position to provide communication between the front end opening and the rear end opening; and an urging member urging the male-side slide valve element toward the closed position, wherein when the male coupling body is drawn into the female-side passage of the female coupling member, the male-side slide valve element is pressed and displaced to the open position by a valve member of the female coupling member.

15. The pipe coupling of claim 14, wherein a continuous concave surface is formed by the rear end surface of the male coupling body and a rear end surface of the male-side slide valve element.

16. The pipe coupling of claim 14, wherein the urging member has a first coil spring and a second coil spring coaxially disposed inside the first coil spring.

* * * * *